United States Patent [19]

Hunter et al.

[11] Patent Number: 5,067,875
[45] Date of Patent: Nov. 26, 1991

[54] COMPOSITE SCISSORS FOR A SWASHPLATE

[75] Inventors: Dave H. Hunter, Cheshire; Kenneth L. Lauck, Beacon Falls; Kevin A. White, Shelton; Robert J. Milne, Oxford; Leonard J. Doolin, Southbury; Stephen V. Poulin, Stratford, all of Conn.

[73] Assignee: United Technologies Corporation, Hartford, Conn.

[21] Appl. No.: 508,204

[22] Filed: Apr. 11, 1990

[51] Int. Cl.$^5$ .............................................. B64C 27/605
[52] U.S. Cl. ................................ 416/114; 416/134 A; 74/60
[58] Field of Search ................. 416/98, 102, 114, 115, 416/134 A, 147, 148; 74/60

[56] References Cited

U.S. PATENT DOCUMENTS

| | | | |
|---|---|---|---|
| 2,410,545 | 11/1946 | Main | 416/114 |
| 2,669,308 | 2/1954 | Thomson | 416/114 |
| 3,558,082 | 1/1971 | Bennie | 416/114 |
| 4,588,355 | 5/1986 | Ferris et al. | 416/114 |
| 4,877,375 | 10/1989 | Desjardins | 416/134 A |

Primary Examiner—Edward K. Look
Assistant Examiner—James A. Larson
Attorney, Agent, or Firm—William J. Sapone

[57] ABSTRACT

A flexible composite scissor assembly is disclosed which utilizes one or more composite straps disposed either in a radial or non-radial relationship between a hub attached to a rotor and an inner or outer ring of a helicopter swashplate. The composite material has sufficient edge-wise stiffness to allow effective torque transmission between the rotor shaft and the swashplate yet has sufficient flexibility to allow for a vertical and angular displacement of the swashplate relative to the rotor shaft. Utilizing a flexible composite scissor assembly eliminates the need for mechanical linkages having pins and bearings which are a frequent source for wear, increasing the reliability of the rotor assembly, while reducing weight.

19 Claims, 12 Drawing Sheets

COMPOSITE SCISSORS FOR A SWASHPLATE

This invention was made with Government support under a contract awarded by the Department of the Army. The Government has certain rights in this invention.

This invention relates to a swashplate assembly for a helicopter and more particularly to a swashplate assembly including flexible composite scissors.

BACKGROUND

Control of a helicopter is effected by varying the pitch of the rotor blades individually as the rotor rotates and by varying the pitch of all of the blades together. This is known respectively as cyclic and collective pitch control. Blade pitch control of a helicopter main rotor is typically achieved by using a swashplate which transfers the motion of non-rotating control members to the rotating members. The swashplate is typically concentrically mounted about a rotor shaft. The swashplate includes two concentrically oriented rings connected by a series of bearings with one ring connected to the airframe (stationary), and the other ring connected to the rotor shaft or hub (rotating). Collective control is achieved by translating the swashplate up and down with respect to the rotor shaft and cyclic control is achieved by tilting the swashplate relative to the rotor shaft. The stationary ring is typically centered about the rotor shaft by a spherical ball joint that allows for tilt of the swashplate, with a standpipe surrounding the rotor shaft allowing translation of the swashplate. Pitch links connect the rotating ring of the swashplate to the pitch or control arms of the rotor blades. The stationary ring of the swashplate is positioned by links or servos which are actuated in response to the pilot's control signals. Thus, when the pilot wishes the swashplate to be raised, lowered or tilted, the pilot directs, through the links or servos, the stationary ring to be raised, lowered or tilted and thus every point on the rotating ring of the swashplate is raised or lowered vertically in a collective or cyclic manner as the rotor rotates. Thus, the swashplate must be capable of moving vertically, i.e., in a direction parallel to the rotor shaft and be able to tilt with respect to the plane of rotation.

Various prior art methods are known for connecting the swashplate to the rotor shaft. For example, one or more pivoted link devices may be used, one end of each device being connected to a ring member and the other end being connectable to the rotor while another one or more pivoted link devices is connected to the stationary ring and to the airframe. These links allow the swashplate to be angularly deflected to allow the ring to tilt or to move vertically with respect to the rotor shaft.

Various problems are encountered with the prior art linkages. For example, since these parts are subject to a substantial amount of movement, rapid wear is typical and these parts are generally high-maintenance items. In addition, such linkages are particularly vulnerable when used in military aircraft where a ballistic impact may cause failure of the swashplate control system.

The rotating ring is connected to the rotor shaft through the pivoted link devices typically referred to as "scissors", with the static ring similarly connected to the airframe. These scissors permit the rings to translate vertically, i.e., move parallel to the rotor shaft and to tilt about a diametral axis of the rings, while maintaining the rings azimuthal position with respect to the rotor.

Each of the scissors comprises two links connected together by a hinge which permits the scissor link to flex vertically. Typically, one link end is mounted to a spherical bearing which is mounted to the ring to prevent independent rotation of the ring, yet permits it to tilt and translate vertically.

DISCLOSURE OF THE INVENTION

It is an object of the present invention to provide a scissors assembly which allows both vertical and angular displacement of a swashplate relative to a rotor shaft, without utilizing hinged linkages with bearing assemblies, to reduce cost, weight and complexity.

It is another object of the present invention to provide a scissor assembly which is capable of transmitting sufficient torque to rotate the rotating swashplate ring while being at the same time sufficiently flexible to allow vertical and angular displacement of the swashplate without using hinged linkages.

These and other objects of the present invention are achieved by providing flexible composite scissor means which allow vertical and angular displacement (tilt) of a swashplate, the composite scissor means having sufficient rigidly to maintain the swashplate azimuthally with the rotor, yet having sufficient flexibility to allow vertical and angular displacement of the swashplate. In particular, a composite flexible scissor assembly is disclosed including a plurality of strap means having tailored structural characteristics to allow vertical and angular displacement of a swashplate relative to a rotor shaft in response to control signals.

In another embodiment of the present invention, the composite flexible scissor means comprise straps having a first portion of flexible material anchored to the rotor shaft, a second portion of less flexible material, strengthened to have increased torsional rigidly, and a third flexible portion disposed between the less flexible section and the swashplate with the combination structure allowing sufficient flexibility to provide vertical and angular displacement of the swashplate in response to a control signal while providing sufficient rigidity to allow efficient torque transmission between the rotor shaft and the swashplate rotating ring.

Other objects features and advantages of the invention will become apparent in light of the following description.

BRIEF DESCRIPTION OF THE DRAWINGS

FIG. 6b is a top view of the composite scissors of FIG. 6a.

DETAILED DESCRIPTION OF THE INVENTION

Figure 1:
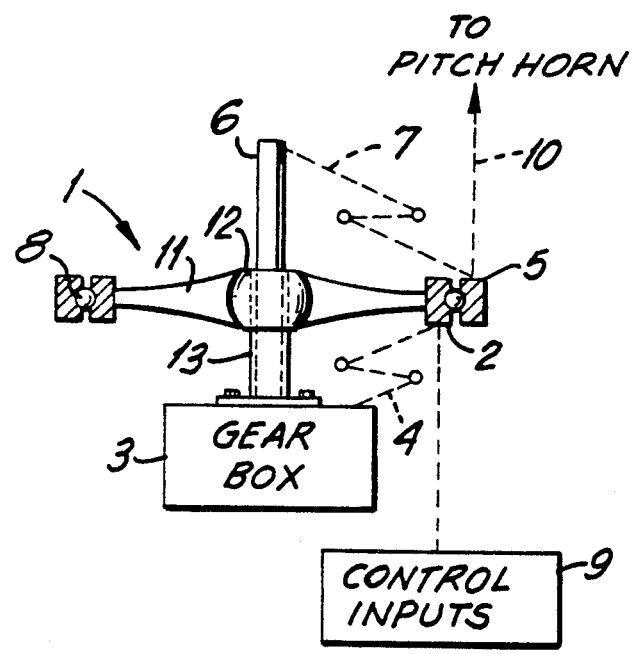
FIG. 1 is an illustrative view of a prior art scissors assembly.
Figure 1A:
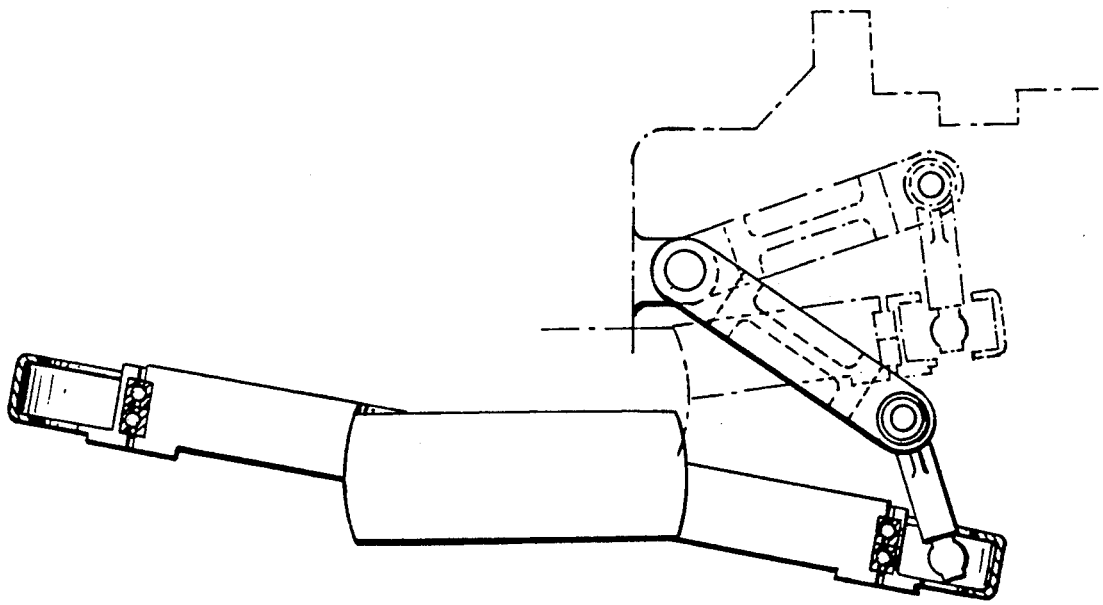
FIG. 1a is an illustrative view of a prior art scissors assembly shown in various orientations.

Referring to FIG. 1, a prior art swashplate 1 has an inner ring 2 held stationery to a gear box 3 by a scissors link 4. The swashplate also has an outer ring 5 that is rotated with a rotor shaft 6 by a scissors link 7. Bearings 8 are disposed between the inner and outer rings permitting relative rotation therebetween. The inner stationery ring 2 is movable in response to control inputs from the pilot or to automatic control inputs 9. The outer rotating ring 5 is connected via a linkage 10 to individual blade pitch horns (not shown) to move the rotor blades in response to the control inputs. A rigid arm 11 is attached at its outer end periphery to the inner ring 2 and at its inner end to a ball joint 12 that is free to slide on a standpipe 13 that encircles the rotor shaft 6. This enables the swashplate to translate up and down and to tilt with respect to the rotor shaft 6 for collective and cyclic control, respectively, while remaining centered. FIG. 1A illustrates the typical movements of a prior art scissors link in response to movement of the swashplate.

Figure 2:
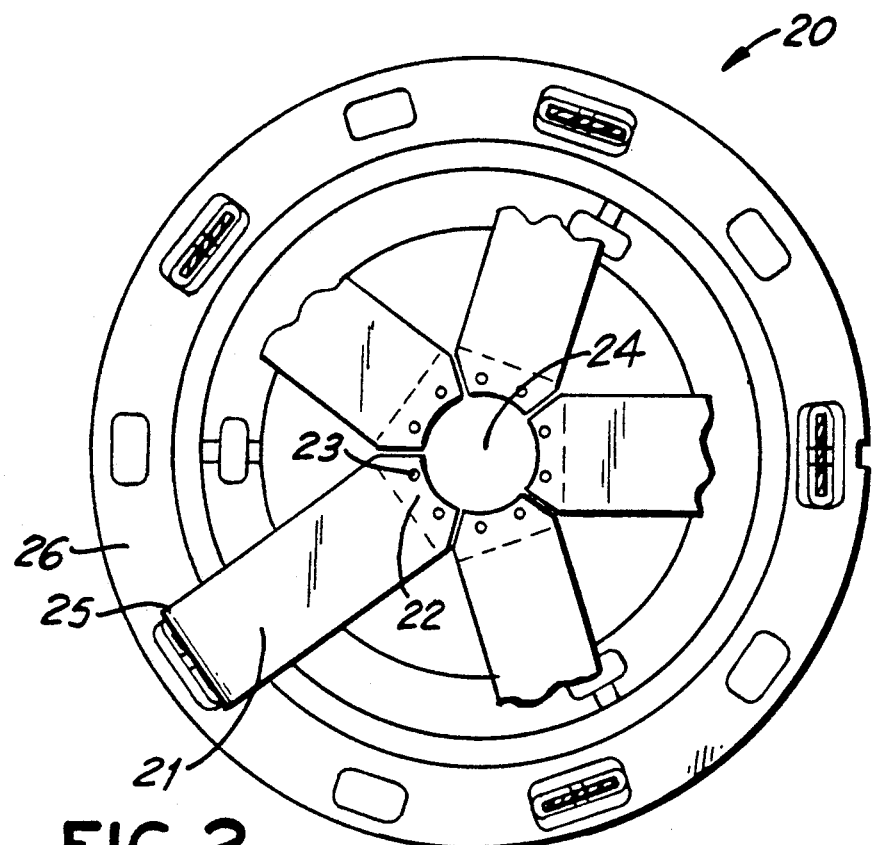
FIG. 2 is a top view of an embodiment of the present invention including a plurality of vertically flexible yet twist resistent composite scissor straps.

Referring to FIG. 2, a top view of a swashplate 20 incorporating a plurality of radial straps 21 which are attached at a first end 22 by bolts 23 to a rotor shaft 24 and at a second end 25, are attached to an outer rotating ring 26 of the swashplate 20. In this embodiment, five separate composites straps are shown, each being fabricated from a composite material which is sufficiently flexible to allow vertical and angular displacement of the swashplate, while providing sufficient twist resistance and rigidity to transmit torque from the rotor shaft to the rotating ring. Each flexible strap has radial and vertical portions having high inplane stiffness and low out-of-plane stiffness, the radial portion having an end rigidly mounted to the rotor shaft. Such a flexible scissor's design fabricated from composite material reduces the need for bearings and eliminates the solid links and hinges, replacing them with unitary flexible straps.

Figure 3:
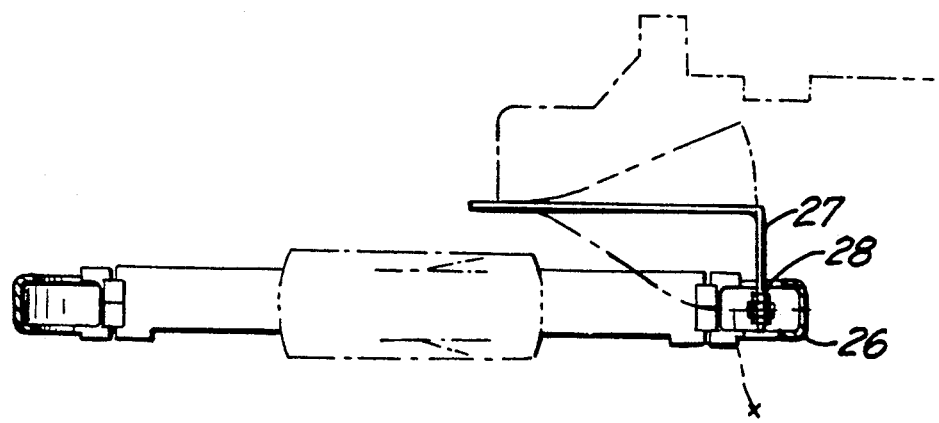
FIG. 3 is a side view of the flexible scissors of FIG. 2.

Referring to FIG. 3, a side view of an individual flexible strap scissor is shown, with the flat composite strap extending radially from the attachment point on the rotor shaft. The strap is sufficiently thin to accommodate the vertical deflection of the swashplate simply by flexing. It is wide so that it can transmit the tangential or edge-wise shearing force that maintains azimuthal indexing of the hub and the rotating swashplate.

The strap 21 includes a downwardly extending portion 27 which attaches to the rotating ring through a spherical elastic bearing 28. This bearing accommodates the tilt of the swashplate about one axis, as well as aiding in accommodating foreshortening as illustrated in phantom. "Foreshortening" refers to the change in effective length of the strap at different swashplate orientation.

Figure 4:
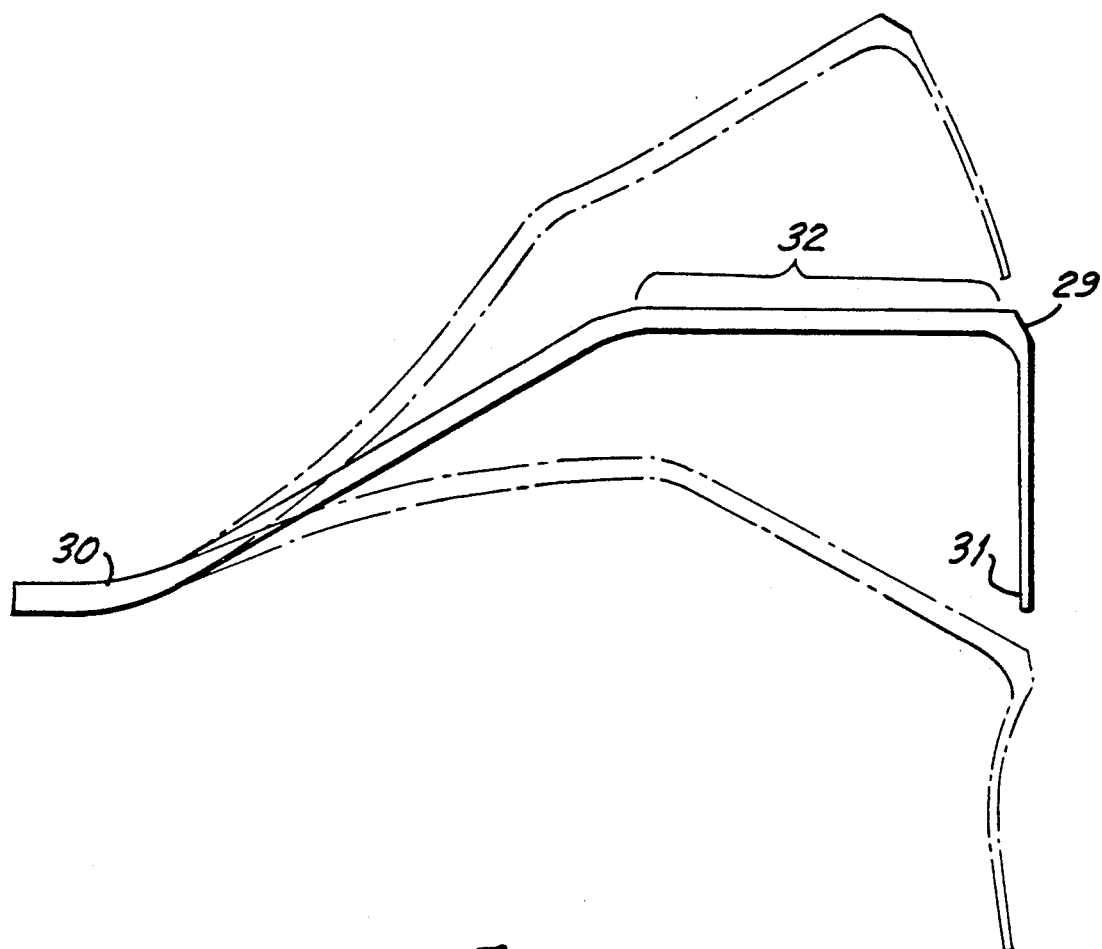
FIG. 4 is an enlarged view of a single strap of FIG. 2 shown in the various strain-induced orientations.

As illustrated in FIG. 4, the straps 21 accommodate articulation and foreshortening by strain-induced bending. The degree of accommodation is a function of the materials chosen and method for manufacture. The strap may be reinforced in areas where increased rigidity is desired, such as at corner 29, and attachment points 30 and 31. It may also be desireable to stiffen a portion 32 of the strap to minimize twist-buckling of the strap. Thus, the strap may accommodate movement without hinges or multi part linkages. This significantly reduces the number of bearings in the scissors assembly which results in improved reliability while also reducing the number of parts used and the weight of the assembly.

Each strap is made from a laminate combination which preferably consist of reinforcing fiber with zero degree ply orientation at the center, covered by cross-plies, preferably being + and −45° plies placed on the outer surfaces. The center 0° plies increase the modulus of the laminate and reduce windup under load. The + and −45° plies provide the best torsional properties while accommodating the enforced displacement of the swashplate. The reinforcing fiber may be graphite, polyaramid, glass or any other fiber, but is preferably graphite fiber. The matrix is preferably urethane but could be any low shear modulus material. The low modulus permits flexing, and should be less than 600,000 psi and preferably between about 15–40,000 psi. For example, urethane has a modulus of about 20,000 psi. The elastomeric bearing incorporated at the swashplate assists in removing lateral cyclic tilt and, to a limited extent, accommodates longitudinal cyclic tilt, reducing flexural and foreshortening strains on the strap.

Figure 5:
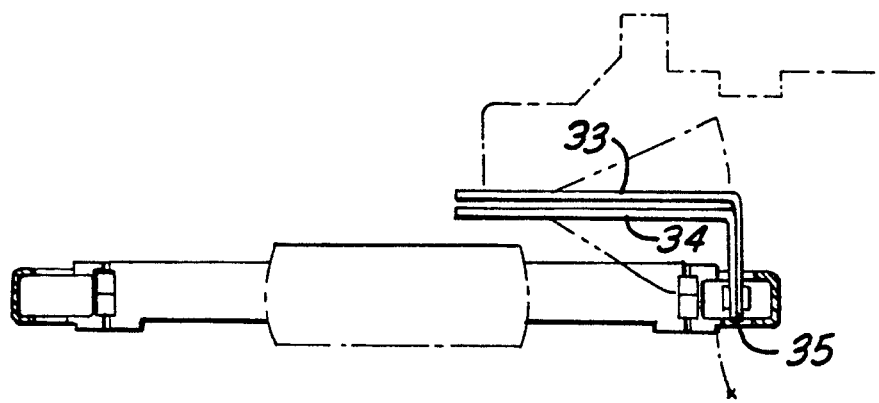
FIG. 5 is a side view of an alternative embodiment of a composite scissors assembly utilizing a double strap.

Another embodiment of the composite scissors is shown in FIG. 5, utilizing a pair of straps 33 and 34 offset by a fixed distance, one placed above the other. Both straps are radially oriented, extending from the rotor shaft and terminating at a bearing 35 on the rotating ring. The distance between the upper and lower straps should be at least a quarter of a inch but may vary depending upon a particular application. Utilizing a pair of straps in an upper and lower orientation stiffens the scissors to further reduce windup when side loads are high, while maintaining flexibility for vertical and angular displacement of the swashplate.

Figure 6B:
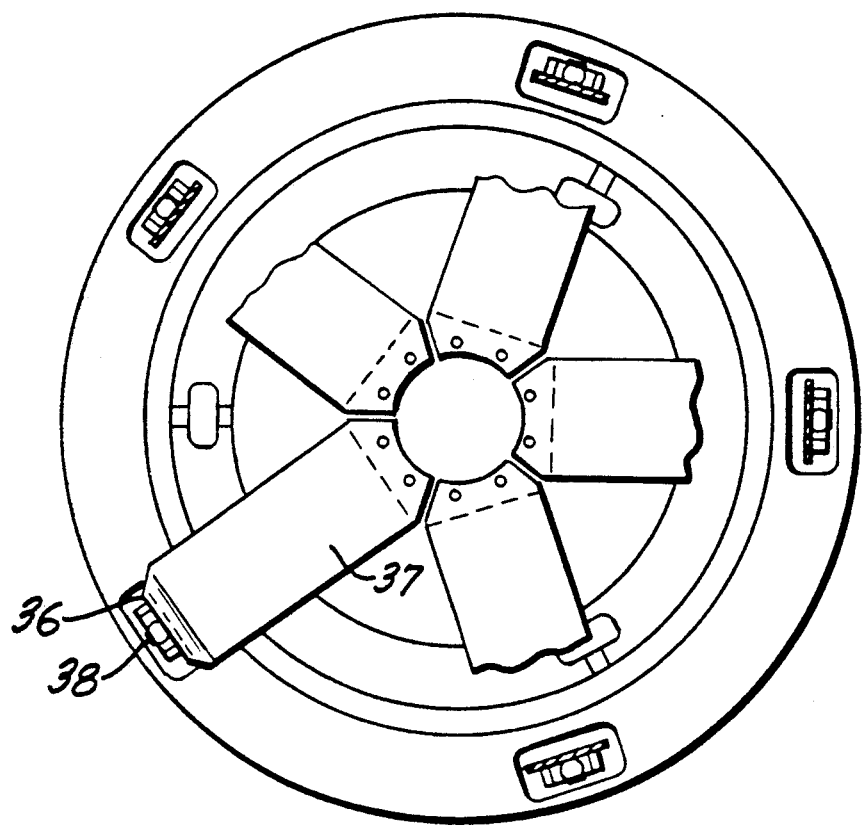
Figure 6A:
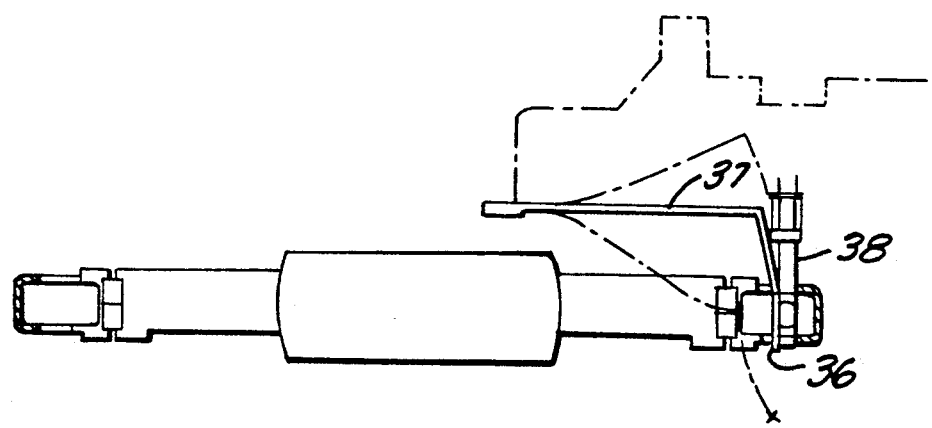
FIG. 6a is a side view of the flexible scissors of FIG. 2, having a lower end attached to a control rod.

FIG. 6a shows an additional modification of the flexible composite scissors shown in FIG. 2, which eliminates the need for a spherical bearing to be provided for attachment of each flexible composite strap to the rotating ring. In this embodiment, an end 36 of a strap 37 is attached to a push rod 38 which is attached to the rotating ring and transmits control signals to the rotor blades. By attaching the lower strap end 36 to the lower push rod end, windup of the flexible scissor is limited to a component of the lateral movement of the push rod. Secondly, attachment at the push rod allows the existing lower push rod bearing to also serve as the flexible scissors bearing, eliminating the need for separate flexural scissors bearings. FIG. 6b shows a top view of this embodiment.

Figure 7:
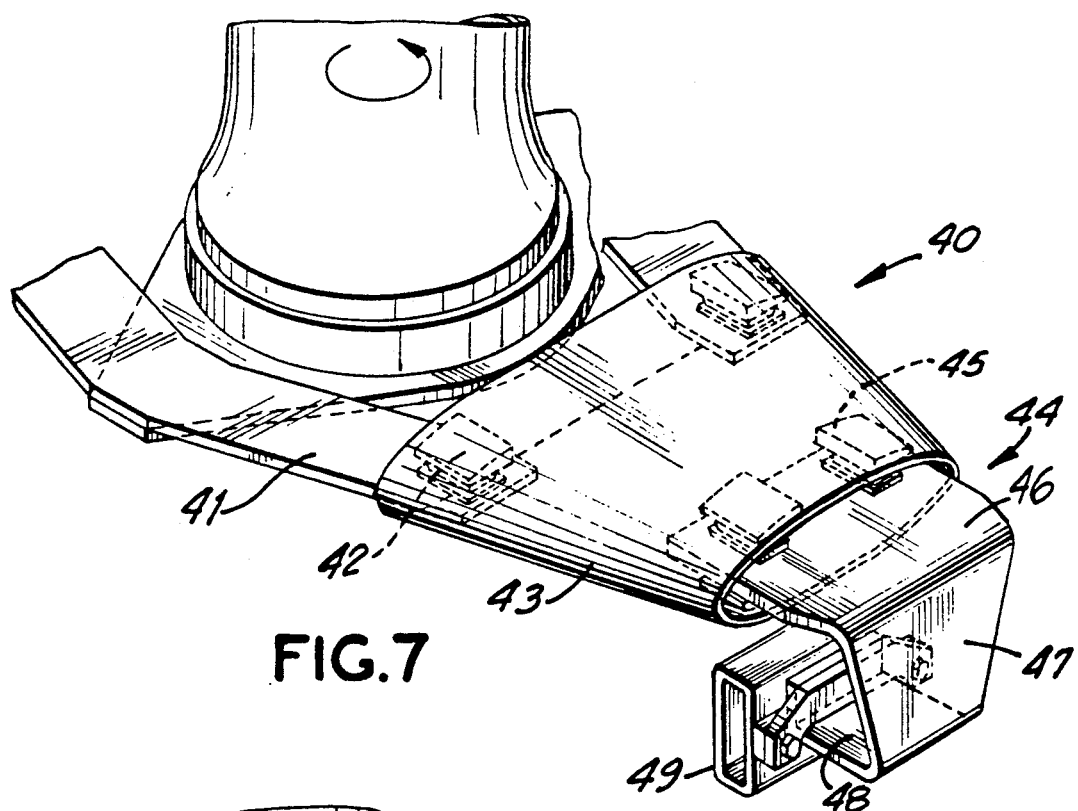
FIG. 7 is a perspective view of an alternative embodiment of the composite scissors having alternate flexible and rigid portions.

Referring to FIG. 7, a perspective view of another embodiment of the composite scissors is shown. The flexible composite scissor 40 includes an inner flex section 41, communicating through elastomeric mounts 42 to a rigid mid section 43, which in turn is attached to an outer flexible section 44 through similar elastomeric mounts 45, with the outer flex section 44 then having an upper flex section 46, a vertical transition region 47, and a lower twist section 48, which attaches to rotating ring 49. The twist section is preferably made using 0° graphite fibers and a urethane matrix, with the twist section lying in the plane of an actuator or push rod attachment. The twist section is stiffer in flex than the rest of the structure but is softer in torsion. Thus, the twist section transitions to all + or −45° laminate in the transition region 47 used to reach above the swashplate assembly.

The rigid mid-section 43 is preferably a rigid torque box communicating through the elastomeric mounts to the inner and outer flexible sections. This combined structure allows the scissors to move with the swashplate while reacting to inplane loads. Utilizing a torque box as the mid section minimizes twist, as the shape of the torque box provides stiffness. The torque box may be a composite formed of crossply fibers and a high modulus matrix such as epoxy. Such a material can be used as the flex sections accommodate vertical and tilt displacement of the rings. The elastomeric mounts permit the composite scissor radial length to be compatible with the degree of movement required.

Figure 8:
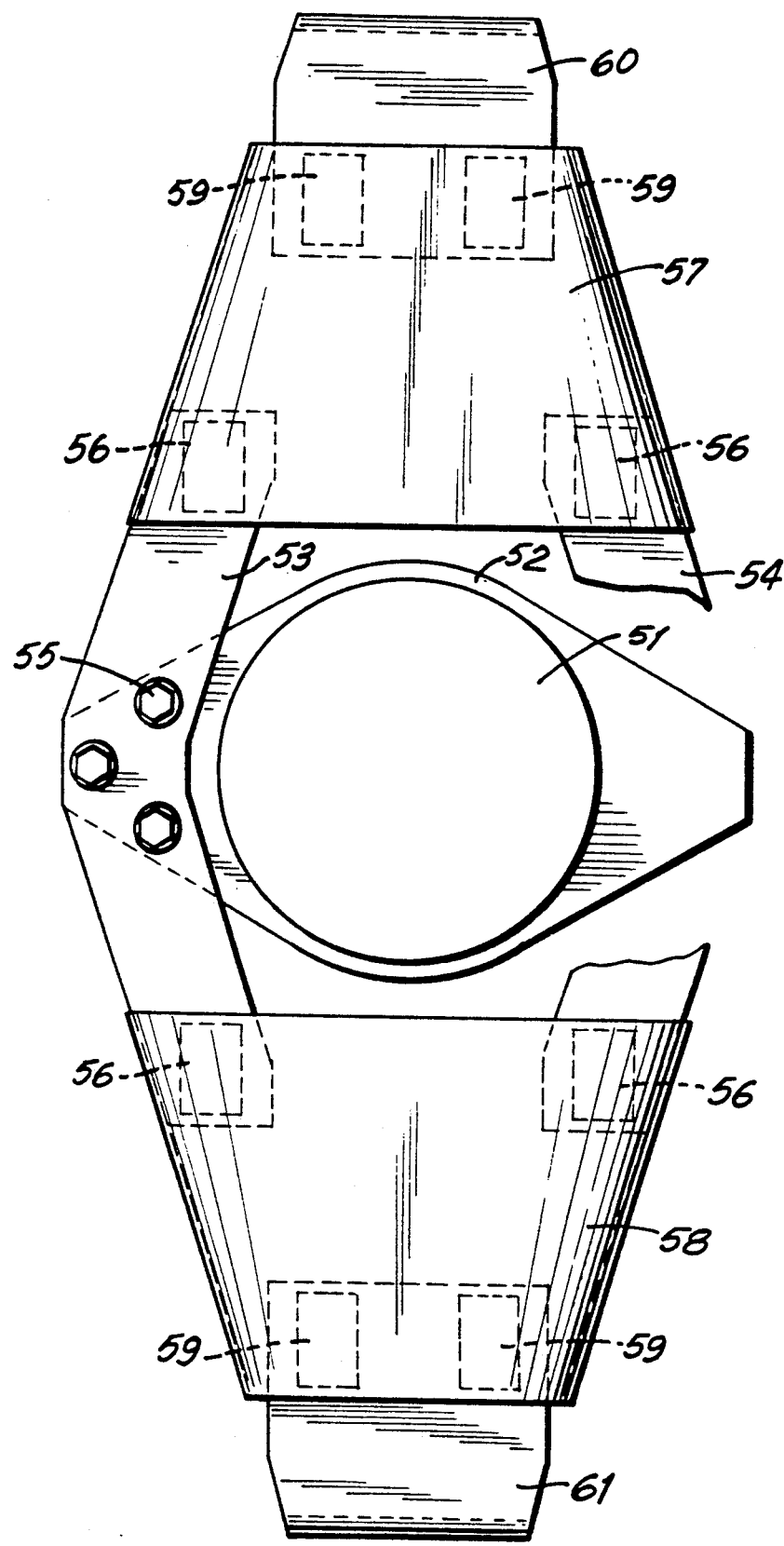
FIG. 8 is a top view of the flexible scissors of FIG. 7.

Referring to FIG. 8, a top view of the flexible composite scissor of FIG. 7 is shown. A rotor shaft 51 has a flanged attachment 52, to which a pair of inner flexural sections 53 and 54 are attached by bolts 55. Elastomeric mounts 56, connect the inner flexible strips to a pair of rigid torque tubes 57 and 58. Two pairs of elastomeric mounts 59 are also incorporated to attached the rigid torque tubes to an outer flexible sections 60, 61.

Figure 9A:
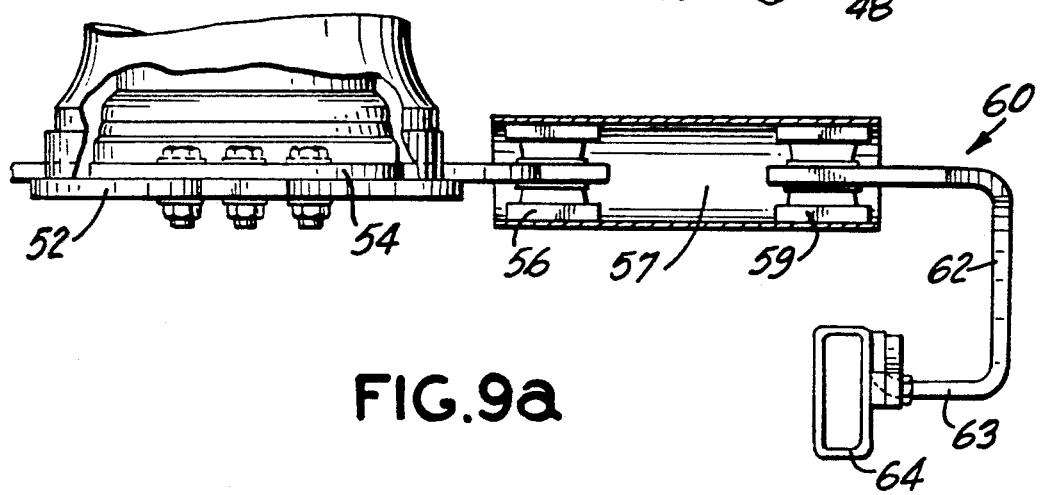
FIG. 9a is a cross-sectional side view of the composite scissor of FIG. 7.
Figure 9B:
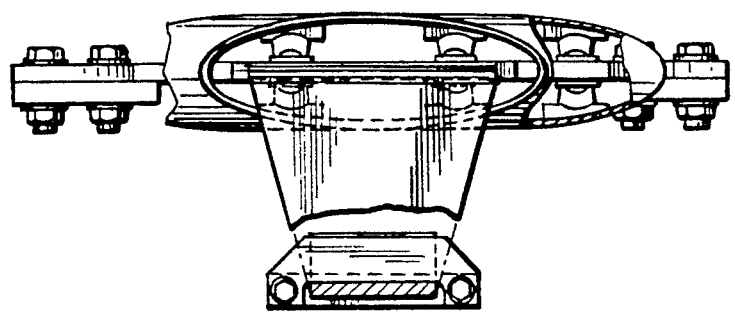
FIG. 9b is a front view of the outer flexural portion.

Referring to FIG. 9a, a portion of the flexible scissor shown in FIG. 8 is shown in cross-section. The inner flexible section 54 is shown bolted to the flanged attachment 52, and the torque tube 57 is shown with the elastomeric mounts 56 and 59 attaching the inner and outer flexural sections thereto. The outer flexural portion 60 has a vertical transition portion 62 and a the twist section 63 which bolts to an outer rotating ring 64 of a swashplate. FIG. 9b shows the outer flexural portion in a front view.

Figure 10:
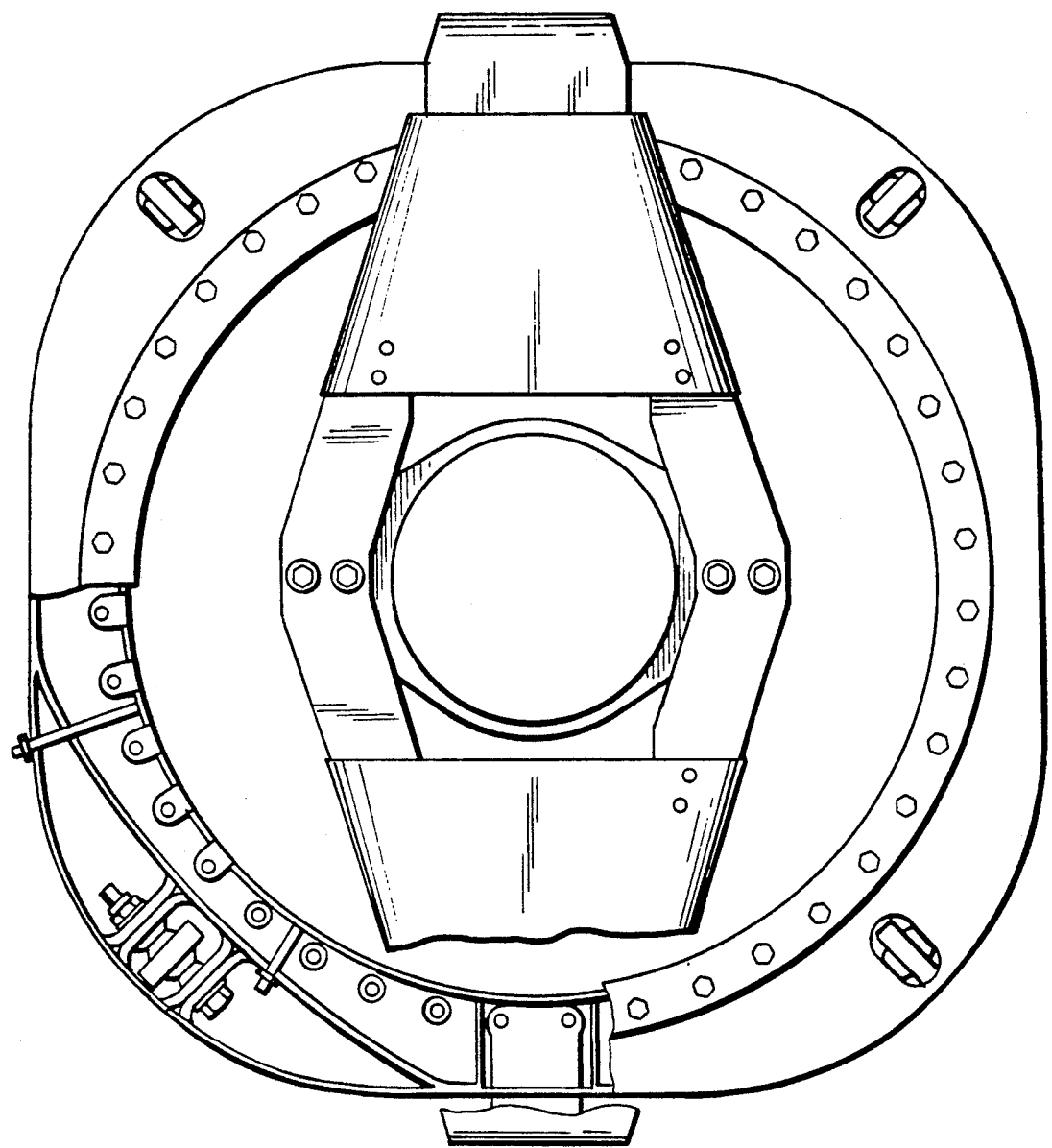
FIG. 10 is a top view of the composite scissor of FIG. 7 shown mounted on a swashplate.

FIG. 10 shows the flexural composite scissors of FIG. 8 mounted to a swashplate, and also shows the provision of four control rods for transmitting control signals from a pilot to the rotor.

Preferably, the flexible composite scissor of this embodiment utilizes inner and outer flex sections having ±45° graphite fiber reinforcement in a urethane matrix. The intent is to flex and twist to accommodate the motion of the swashplate. While the scissors are subjected to enforced strain, they must also transmit the in-plane loads which rotate the rotating ring with the rotor shaft. Under these conditions, the limiting parameters are bending strain and buckling stability.

The mechanism for buckling is developed by a coupling of out-of-plane and torsional deformation with in-plane loads. As a beam twists and deflects out of plane, the beam looses stiffness. Eventually, the beam is unable to sustain any increase in load. The mathematical expression used to calculate the critical buckling moment is:

critical edge-wise moment = [(flatwise stiffness) * (torsional stiffness) * 4]$^{0.5}$ * (length of beam)

Figure 11:
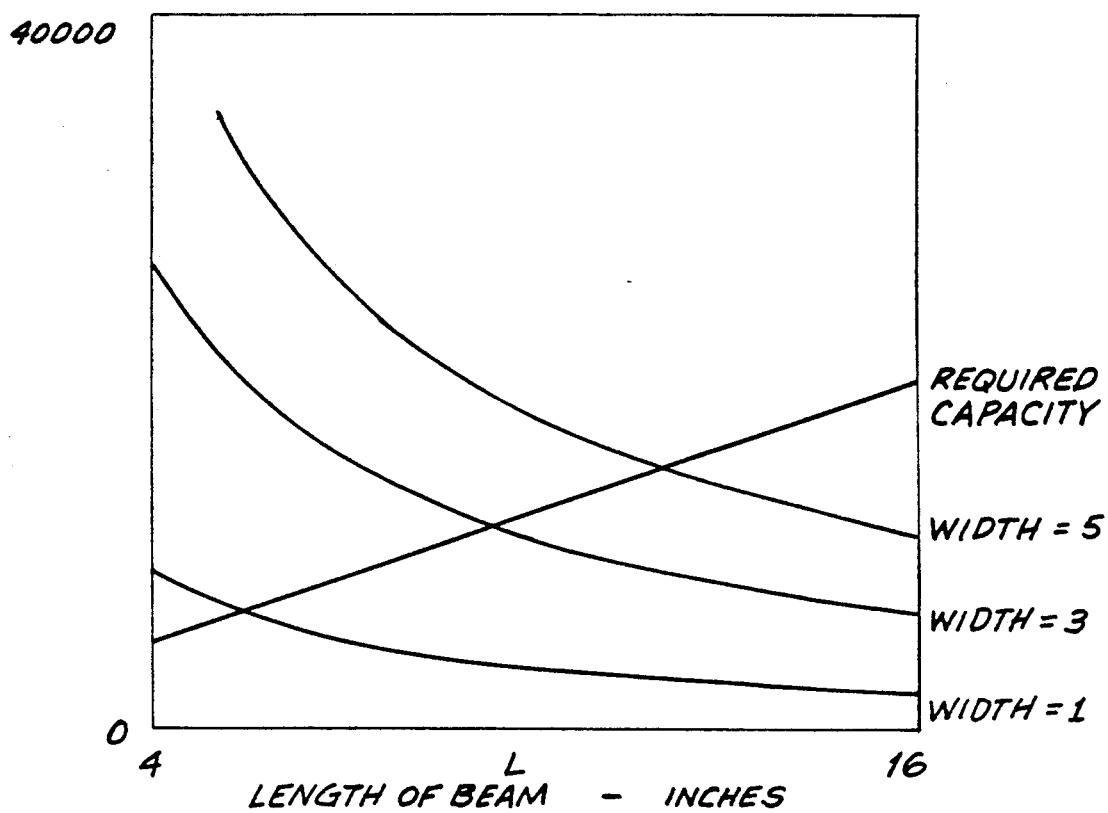
FIG. 11 is a graph showing the dimensional requirements for the composite scissor as determined by twist-bend buckling for a beam thickness of 0.4 inches.
Figure 12:
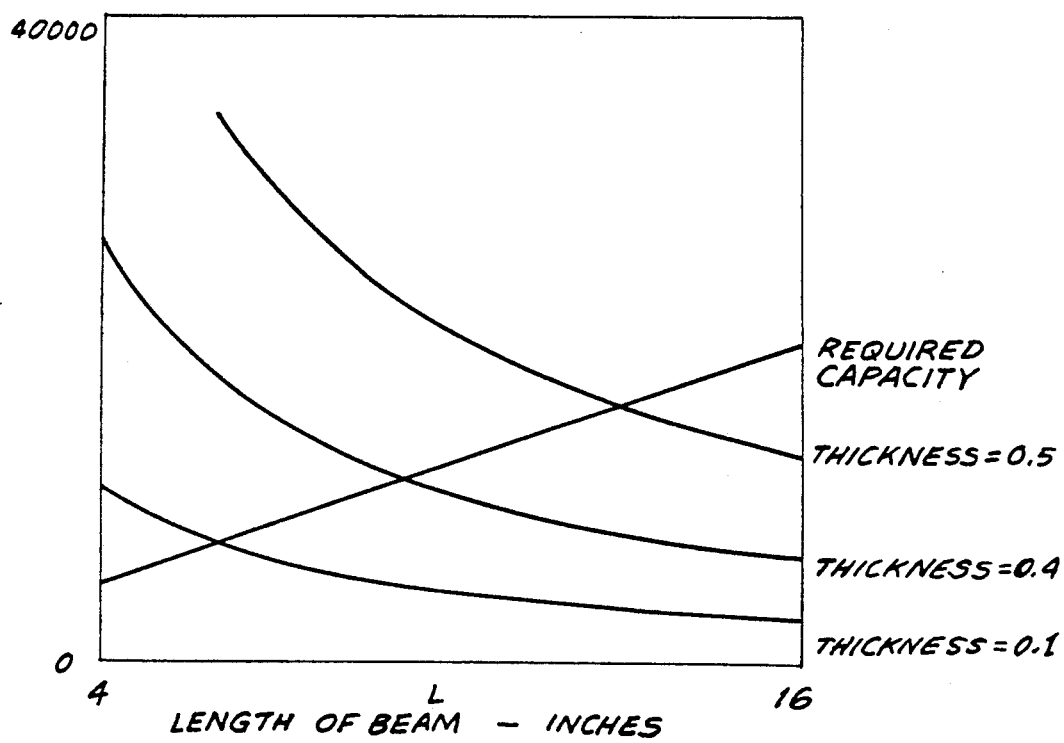
FIG. 12 is a graph showing the dimensional requirements for the composite scissor as determined by twist-bend buckling for a beam width of 3.0 inches.

This expression is derived from a uniform beam with fixed end conditions subjected to an edge-wise moment. Generally, the width and length of the beam has a very small influence on the critical buckling moment as compared to the thickness. Furthermore, the bending and shear moduli of the material are in opposition. To obtain maximum shear modulus, a cross-ply fiber orientation is preferred. This decreases the bending modular which lowers the maximum moment which can be sustained by the beam. FIGS. 11 and 12 illustrate the dimensional requirements for a composite scissor as determined by twist bend buckling, for beam thickness and width of 0.4 and 3 inches respectively.

One difficulty in utilizing flexible composite scissors for attachment to the rotating swashplate ring, is that where the scissors members are flat straps, with elastomeric bearings mounted on top of the rotating member to provide the required radial play to accommodate the difference between the rigid body motion of the swashplate and the elastic motion of the scissor, the radial strap is placed above the plane of the actuator link and push rod attachment. The inplane being of the arm which results from this offset when the arm is oriented along the axis of tilt produces large straisn if the beam is sufficiently wide to be stiff enough to position the swashplate effectively. To maintain a fixed strain for a given on-plane deflection, the length of the beam increases as a function of width.

Figure 13:
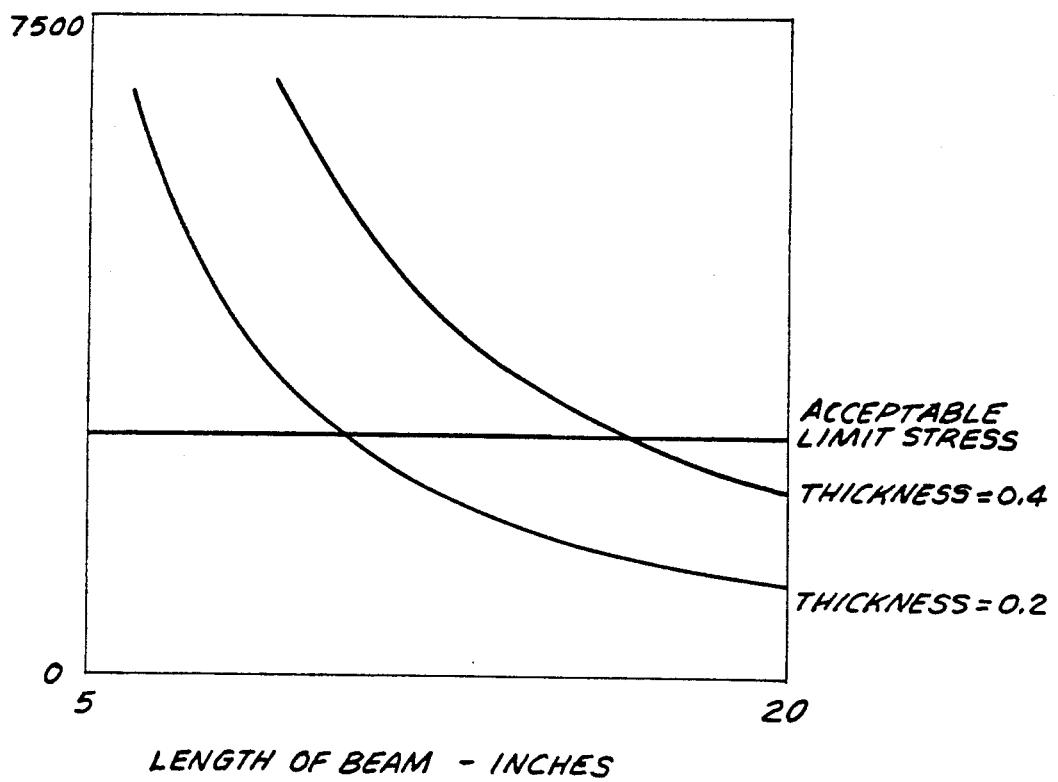
FIG. 13 is a graph illustrating the relationship between strap length and bending stress.

An alternative is to place the flexure portions in the plane of the twist. To accomplish this, the beam must extend over the top of the stationery swashplate before stepping down. In this case, the design may be severely constrained by the permissible length for the design space. Out-of-plane deflections require a very thin strap to maintain acceptable stress levels, as shown in FIG. 13. Also, the required width of the beam produces high strains when subjected to twist.

Figure 14:
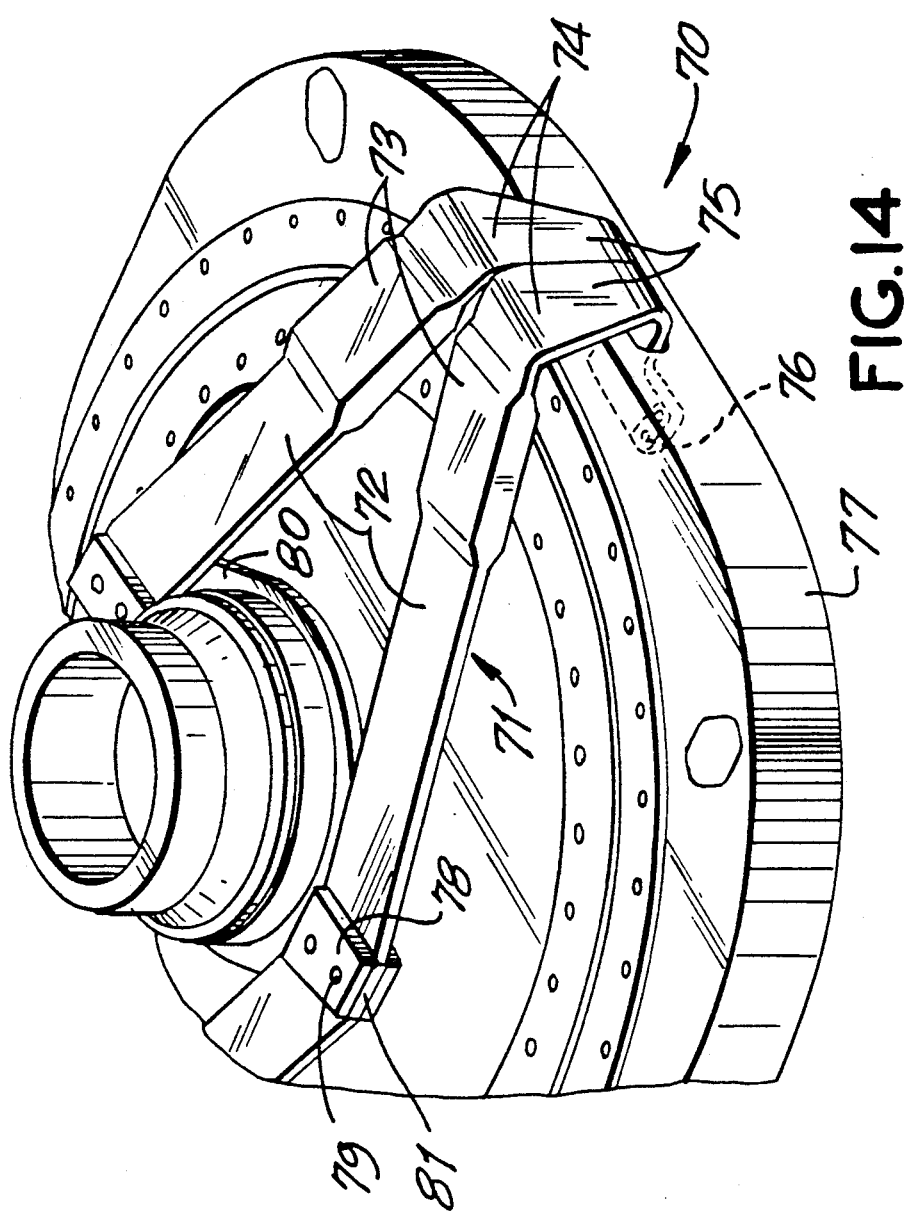
FIG. 14 is a perspective view of an alternative embodiment of the composite scissors utilizing two non-radial elongated straps.

To increase the available flexural length for the straps, a non-radial design is preferred. Referring to FIG. 14, a composite scissor assembly 70 is shown with a pair of arms 71 disposed in a non-radial relationship. Each arm includes an inner flexural section 72, communicating with a thickened portion 73 which provides increases rigidly without utilizing a torque tube and then transitions to an outer flexural section 74 which extends through a flexible transition portion 75 to a lower orthogonal flexure 76 for attaching to an outer rotating ring 77.

Figure 15:
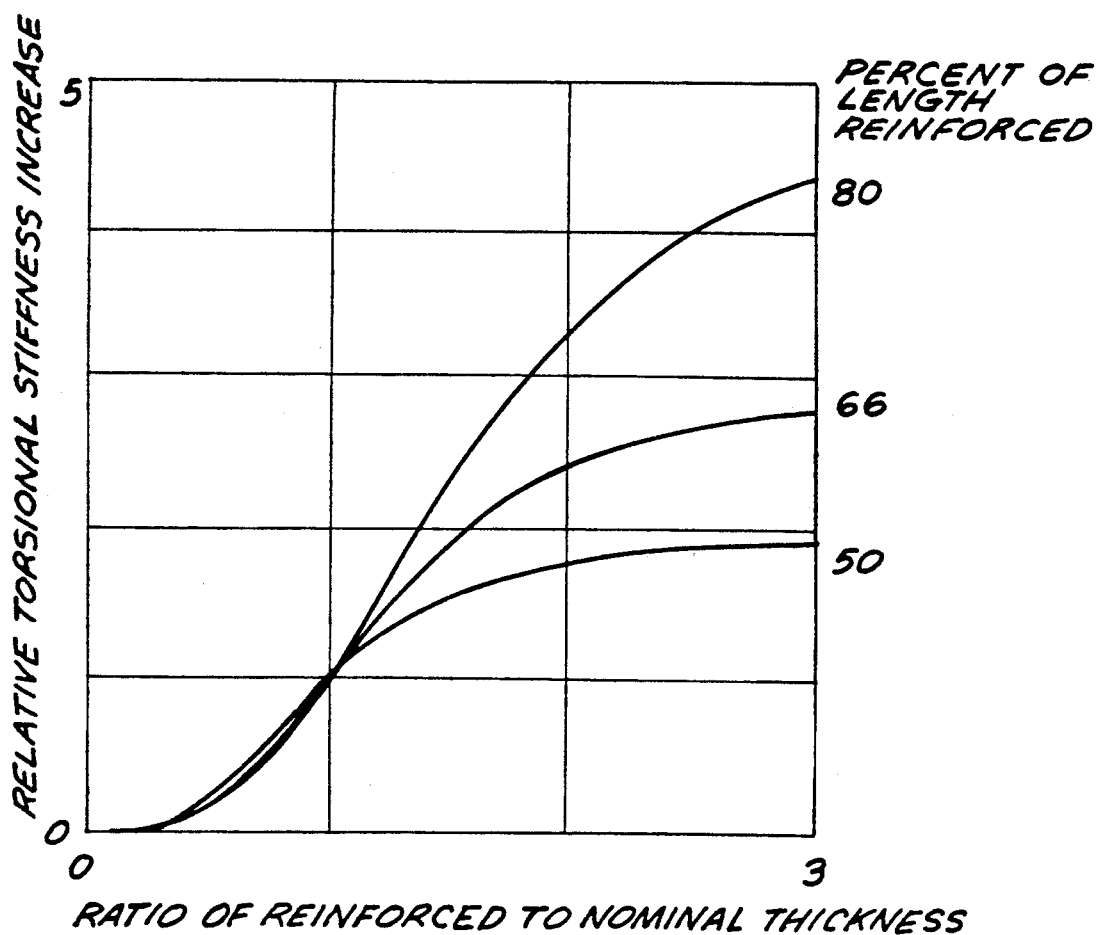
FIG. 15 illustrates the ratio of reinforced to nominal thickness, showing the torsional stiffness increase as a function of percent increase in thickness.

Since these straps are in a non-radial relationship, they are of increased length and can accommodate the vertical motion of the swashplate without flexure of the thickened section, which is located so as to minimize its effect on the flexural strain at maximum displacement. By providing two orthogonal bending sections, the scissor can deform in 2 degrees-of-freedom, which is sufficient to accommodate the enforced control displacements entirely through flexure, eliminating the need for spherical bearings. Thus, the end may be bolted to the rotating ring. The elastic deformation of the flexural members results in a relative radial displacement between the end of the beam and the swashplate. This is accommodated by bending in the connecting section which joins the upper and lower flexural sections. Because the offset results in an in-plane deformation at the swashplate, as a result of the torsional loading, the upper section provides a maximum torsional stiffness. As shown by FIG. 15, the maximum stiffness attainable is a function of the percent length stiffened and the minimum stiffness.

Various means may be used to attach the straps to the hub and the swashplate ring, such as clamping the straps to the swashplate, rather than just drilling and bolting. Referring again to FIG. 14, the arms 71 are clamped by plate 78 and bolts 79 to the rotor hub 80. Each arm is attached at opposite ends to the swashplate ring with a mid-section 81 clamped to the hub. For connecting to the swashplate, it may be preferable to use a slip bushing to provide the clamping force to the strap having bonded reinforcements. A preload in the through bolts thus reacts against the slip bushing to provide restraint against local buckling of the fibers in the matrix.

By proving flexural composite scissor assemblies for incorporation on rotor aircraft, various bearing and pin connection type linkages can be eliminated, increasing aircraft reliability while minimizing weight. In addition, such linkages are believed to be more accommodating to impacts and thus increase the survivability of the aircraft. While the invention has been shown and described with respect to various embodiments, it will be understood by those skilled in the art, that various changes and modifications could be made without varying from the scope of the present invention.

What is claimed is:

1. A rotor assembly for a helicopter, having a swashplate including a stationery ring and a rotating ring, disposed about a rotor shaft, the rotor assembly further comprising flexible composite scissor means for attaching the rotating ring to the rotor shaft, the composite scissor means having portions of varying flexibility and being sufficiently thin to accommodate vertical and tilting swashplate movement and sufficiently wide to transmit tangential forces and resist twist buckling for rotating the rotating ring.

2. A flexible composite scissor for a helicopter having a swashplate for transmitting control inputs to a rotor; the scissor comprising at least one strap attached at a first end to a rotor shaft and at a second end to a rotating ring of a swashplate, said strap being sufficiently thin to allow vertical and angular displacement of the swashplate and sufficiently wide to transmit tangential forces and resist twisting buckling, the strap having a pair of flexible portions separated by a relatively stiffer portion.

3. The composite scissors of claim 2 wherein the second end attaches to the rotating ring through a spherical bearing.

4. The composite scissors of claim 2 wherein the second end attaches to a lower end of a pushrod.

5. The composite scissors of claim 2 wherein the scissor comprises a pair of straps in an upper and lower orientation.

6. The composite scissors of claim 2 wherein the strap is made from a fiber reinforced laminate.

7. The composite scissors of claim 6 wherein the laminate has 0° core fiber plies covered by + and −45° fiber plies.

8. The composite scissors of claim 6 wherein the fiber reinforced laminate has graphite fibers disposed in a urethane matrix.

9. The composite scissors of claim 2 wherein the stiffer portion comprises a rigid torque tube.

10. The composite scissors of claim 2 wherein the stiffer portion comprises a thickened section having additional fiber reinforced plies.

11. The composite scissors of claim 2 wherein the flexible portions are an inner rotor shaft attachment portion and an outer swashplate ring attachment portion.

12. The composite scissors of claim 11 wherein the outer attachment portion has an upper flex section, a vertical transition section and a lower twist section.

13. The composite scissors of claim 12 wherein the lower twist section is composed of 0° fibers in a urethane matrix.

14. The composite scissors of claim 6 wherein the fibers are from the group consisting essentially of graphite, glass and polyaramid fibers.

15. The composite scissors of claim 13 wherein the twist section is stiffer in flex and softer in torsion than the other flexible portions.

16. The composite scissors of claim 2 wherein each strap is disposed in a non-radial orientation.

17. The composite scissors of claim 16 wherein each strap has two ends attached to the rotating ring, with a center portion fixed to the rotor shaft.

18. The composite scissors of claim 11 wherein the outer attachment portion has an upper flex section, a vertical transition section and an orthogonal lower flexure section.

19. A method for supporting a swashplate mounted on a helicopter for transmitting control inputs to a rotor, the swashplate supported for vertical and angular displacement, the method comprising:

providing a unitary flexible composite scissor having portions of varying flexibility, the scissor comprising at least one strap which is sufficiently thin to allow vertical and angular displacement of the swashplate and sufficiently wide to transmit tangential forces and resist twist buckling; and mounting the scissor at a first end to a rotor shaft and at a second end to the swashplate.

* * * * *